(12) United States Patent
Raman et al.

(10) Patent No.: US 10,612,197 B1
(45) Date of Patent: Apr. 7, 2020

(54) CONCRETE CHIPPING ROBOT

(71) Applicant: RevolutioNice Inc., Belleville, NJ (US)

(72) Inventors: Sreenivas Raman, Park Ridge, NJ (US); Elie Cherbaka, Franklin Lakes, NJ (US); Ryan J. Giovacchini, Hamilton, NJ (US); Brian Jennings, Paramus, NJ (US); Thomas C. Slater, New York, NY (US)

(73) Assignee: RevolutionNice Inc., Belleville, NJ (US)

( * ) Notice: Subject to any disclaimer, the term of this patent is extended or adjusted under 35 U.S.C. 154(b) by 0 days.

(21) Appl. No.: 15/185,457

(22) Filed: Jun. 17, 2016

Related U.S. Application Data

(60) Provisional application No. 62/180,607, filed on Jun. 17, 2015.

(51) Int. Cl.
*E01C 23/12* (2006.01)
*B25J 15/00* (2006.01)
*E01D 22/00* (2006.01)

(52) U.S. Cl.
CPC ......... *E01C 23/124* (2013.01); *B25J 15/0019* (2013.01); *E01D 22/00* (2013.01)

(58) Field of Classification Search
CPC .... B25J 15/0019; E01D 22/00; E01C 23/124; G01R 31/2834; G01R 31/2868; G01R 31/2893

USPC .......... 125/16.01; 299/1.1, 1.2, 1.5
See application file for complete search history.

(56) References Cited

U.S. PATENT DOCUMENTS

| | | | | |
|---|---|---|---|---|
| 3,877,180 A | * | 4/1975 | Brecker | B24B 49/16 451/24 |
| 4,310,198 A | * | 1/1982 | Destree | B23D 47/005 125/14 |
| 4,617,219 A | * | 10/1986 | Schupack | B32B 13/14 428/113 |
| 4,748,966 A | * | 6/1988 | Kennedy | B28D 1/045 125/14 |
| 5,067,085 A | * | 11/1991 | Wenzel | B25J 9/1684 700/164 |
| 2004/0231654 A1 | * | 11/2004 | Parsells | B23D 57/0007 125/21 |
| 2014/0113525 A1 | * | 4/2014 | Chan | G05B 19/19 451/5 |
| 2015/0360338 A1 | * | 12/2015 | Rizzo, Jr. | B24B 19/14 451/6 |

* cited by examiner

*Primary Examiner* — George B Nguyen
(74) *Attorney, Agent, or Firm* — Brient IP Law, LLC

(57) ABSTRACT

A chipping robot has a chipping gun attached to the end of a multi-axis robotic manipulator mounted on a powered, movable, platform that can be raised and lowered to access the underside of structures that may be substantial distances above the ground, for example, the underside of an elevated highway. The entire assembly is maneuverable under the work area and the platform may raised to access the concrete. Once the work area is in reach of the arm, the device is able to use numerous tools to complete essential steps of chipping portions of the concrete.

2 Claims, 8 Drawing Sheets

| | |
|---|---|
| 31 | Cable Retraction System |
| 32 | Power/Fluid Lines |
| 33 | Motor Disengage Switch |
| 34 | Deployable Stabilizer |
| 35 | Mecanum/Omni Wheels |
| 36 | Situational Awareness Sensor |
| 37 | End-Effector Positioning System |
| 38 | Chipping Tool |
| 39 | Force Transducer |
| 310 | Lights |
| 311 | Camera |
| 312 | Compressed Air Nozzle |
| 313 | Rebar Detection Device |
| 314 | Vacuum |
| 315 | Deployable Shroud |
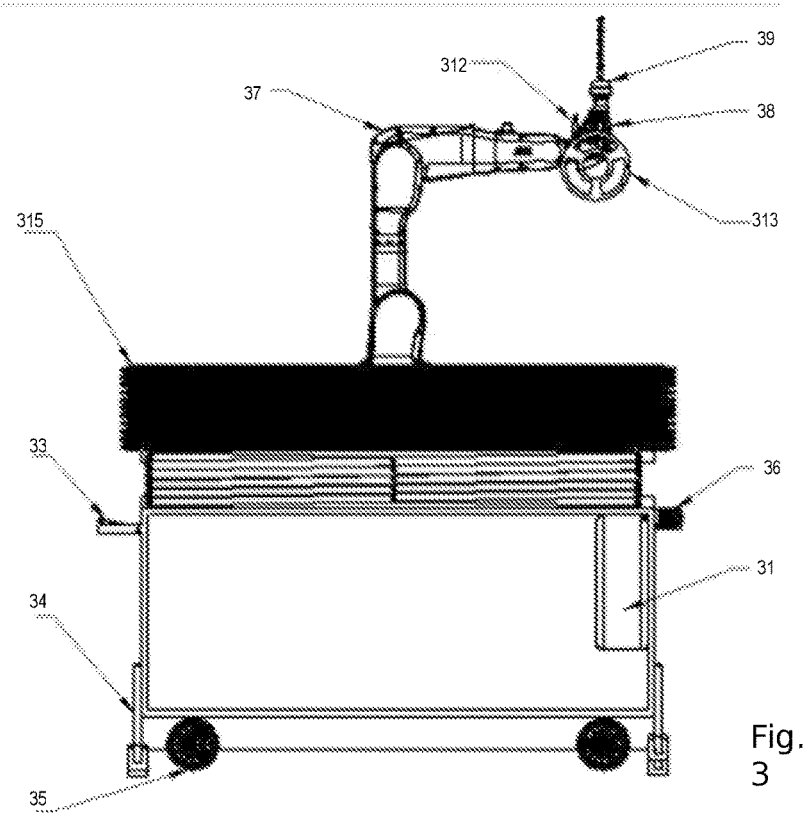
Fig. 3
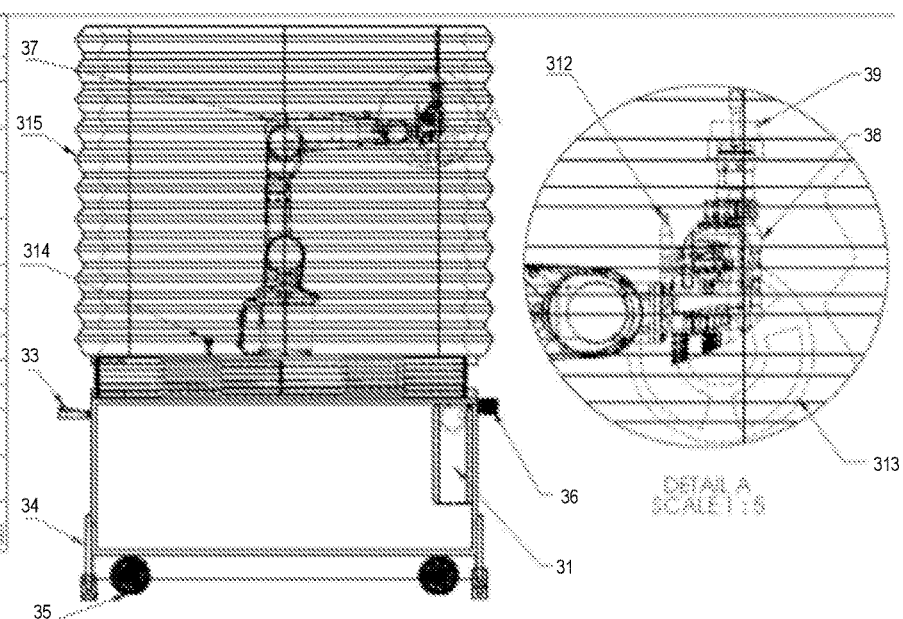
Fig. 4
Fig. 5

| # | |
|---|---|
| 31 | Cable Retraction System |
| 32 | Power/Fluid Lines |
| 33 | Motor Disengage Switch |
| 34 | Deployable Stabilizer |
| 35 | Mecanum/Omni Wheels |
| 36 | Situational Awareness Sensor |
| 37 | End-Effector Positioning System |
| 38 | Chipping Tool |
| 39 | Force Transducer |
| 310 | Lights |
| 311 | Camera |
| 312 | Compressed Air Nozzle |
| 313 | Rebar Detection Device |
| 314 | Vacuum |
| 315 | Deployable Shroud |

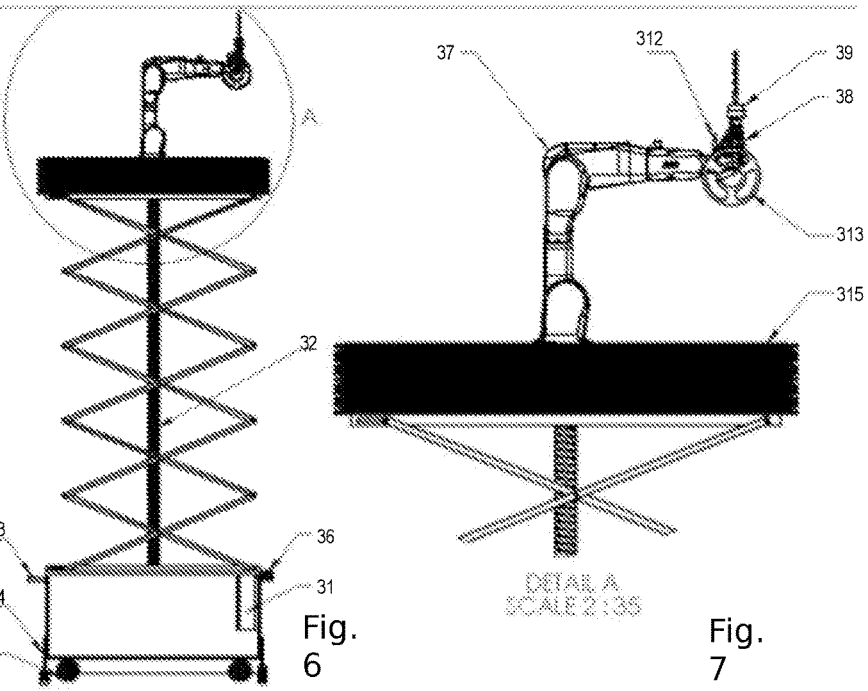

| # | |
|---|---|
| 31 | Cable Retraction System |
| 32 | Power/Fluid Lines |
| 33 | Motor Disengage Switch |
| 34 | Deployable Stabilizer |
| 35 | Mecanum/Omni Wheels |
| 36 | Situational Awareness Sensor |
| 37 | End-Effector Positioning System |
| 38 | Chipping Tool |
| 39 | Force Transducer |
| 310 | Lights |
| 311 | Camera |
| 312 | Compressed Air Nozzle |
| 313 | Rebar Detection Device |
| 314 | Vacuum |
| 315 | Deployable Shroud |

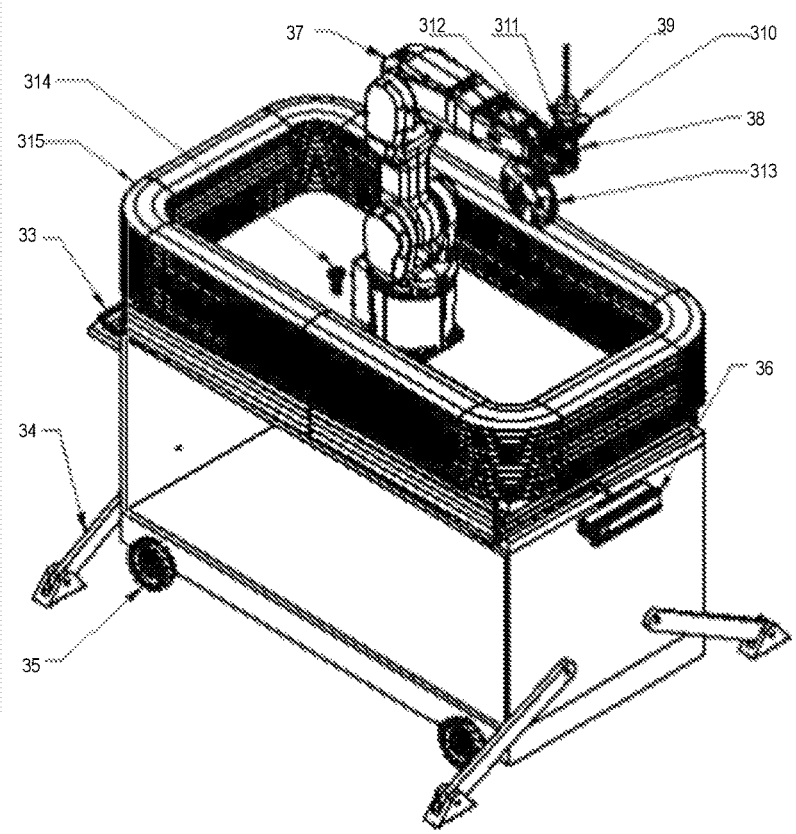

Fig. 8

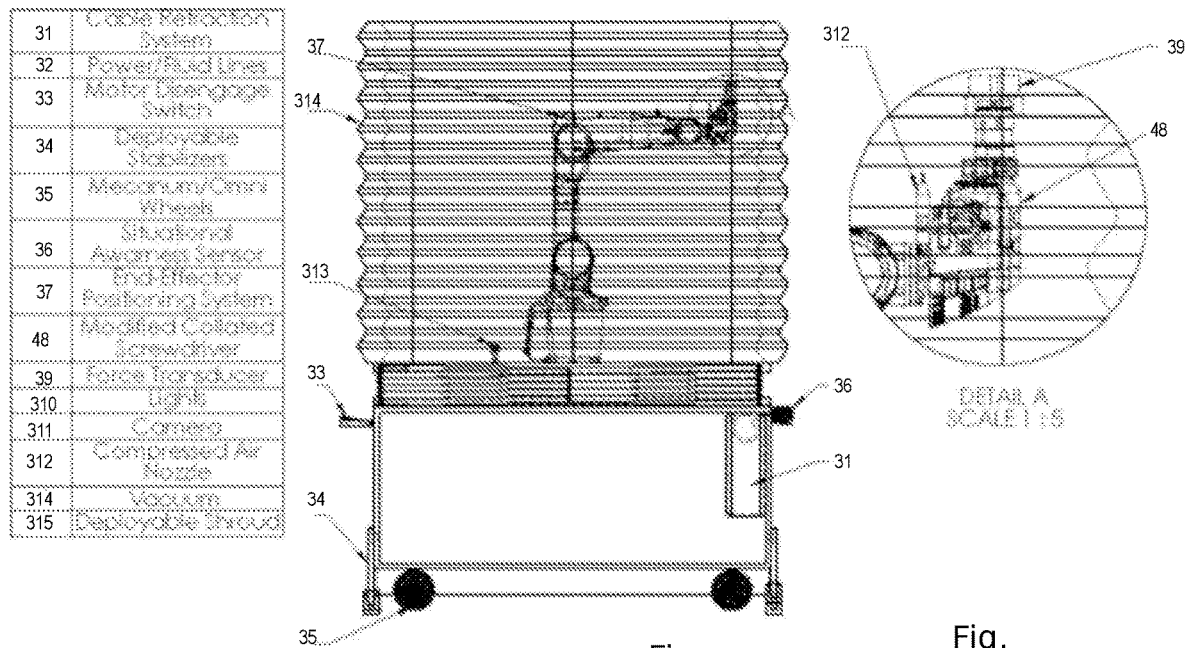
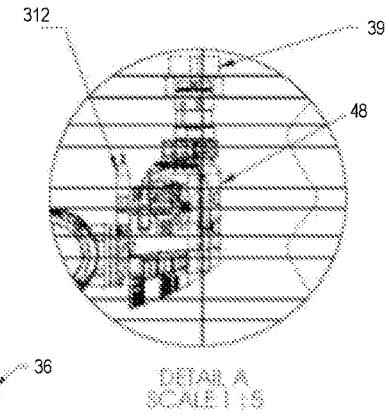
Fig. 11
Fig. 12
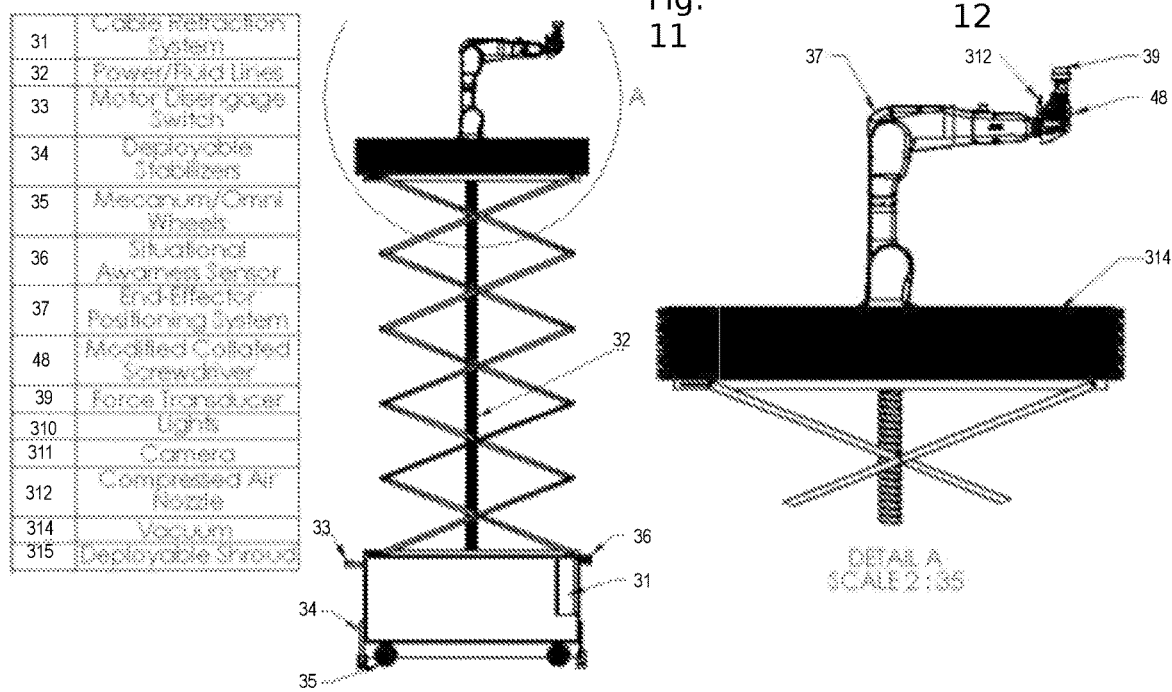
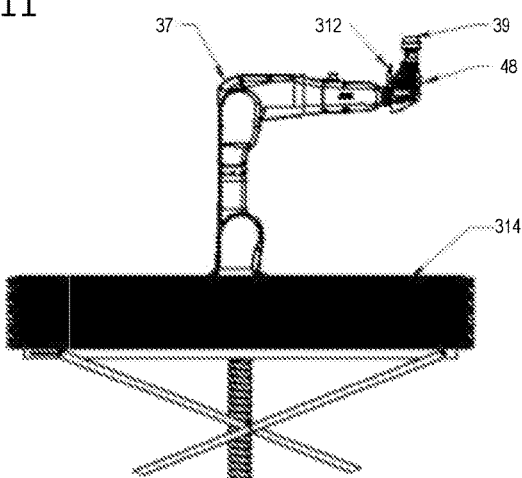
Fig. 13
Fig. 14

CONCRETE CHIPPING ROBOT

CROSS-REFERENCES TO RELATED APPLICATIONS

This application claims the benefit of U.S. Provisional Application For Patent, Ser. No. 62/180,607, filed Jun. 17, 2015 and whose contents are incorporated by reference herein in their entirety.

FIELD OF THE INVENTION

Embodiments of the present invention include concrete chipping systems, and more specifically, robots for concrete chipping.

BACKGROUND OF THE INVENTION

Concrete surfaces deteriorate over time and are maintained by patching worn areas. Concrete that is compromised is removed with a chipping gun, internal structures, such as rebar, are repaired if present, and then the area is filled with new concrete. The concrete removal part of this task is difficult and dangerous for human workers as it is often performed on a small platform lift and at great heights. The chipping tool is heavy and difficult to operate and needs to be held above one's head. As the material being removed is directly overhead, workers are exposed to the risk of being struck by falling pieces of concrete of various sizes. It is also difficult to remove only the concrete that is structurally compromised as the chipper is indiscriminate and the worker is relied upon to estimate the hardness of the concrete (a proxy for strength) as he is chipping it away. It is common for too little or too much material to be removed leading to occasional patch failure and increased costs. A partially or fully automated concrete chipping solution that incorporates modern computer controls would allow for workers to remain safely on the ground and allow for higher quality concrete removal and repair.

BRIEF SUMMARY OF THE INVENTION

An object of the present invention is a robot for concrete chipping.

Another object of the present invention is a robot which can chip concrete under remote control.

Yet another object of the present invention is a robot which can chip concrete in a dynamic environment.

Still another object of the present invention is a concrete chipping robot which is mobile.

An embodiment of the present invention is a chipping robot comprising a chipping gun attached to the end of a multi-axis robotic manipulator mounted on a powered, movable, platform that can be raised and lowered to access the underside of structures that may be substantial distances above the ground, for example, the underside of an elevated highway. The entire assembly is maneuverable under the work area and the platform may be raised to access the concrete. Once the work area is in reach of the arm, the device is able to use numerous tools to complete essential steps of chipping portions of the concrete.

BRIEF DESCRIPTION OF THE SEVERAL VIEWS OF THE DRAWING

FIG. 1a depicts a top view of a tool according to a particular embodiment;

FIG. 1b depicts a detail view of the tool of FIG. 1a;

FIG. 1c depicts a side view of the tool of FIG. 1a;

FIG. 1d depicts an isometric view of the tool of FIG. 1a;

FIG. 3 depicts a side view of a concrete chipping robot according to a particular embodiment;

FIG. 4 depicts the concrete chipping robot of FIG. 3 with a shroud in a raised position;

FIG. 5 depicts a detail view of the concrete chipping robot of FIG. 4;

FIG. 6 depicts a concrete chipping robot with a platform in a raised position;

FIG. 7 depicts a detail view of the concrete chipping robot of FIG. 6;

FIG. 8 depicts concrete chipping robot according to another embodiment;

FIG. 11 depicts the concrete chipping robot of FIG. 8 with a shroud in a raised position;

FIG. 12 depicts a detail view of the concrete chipping robot of FIG. 11;

FIG. 13 depicts a concrete chipping robot with a platform in a raised position;

FIG. 14 depicts a detail view of the concrete chipping robot of FIG. 13;

DESCRIPTION OF THE INVENTION

Premise of Operation

Figures 1A, 1B, 1C, 1D:
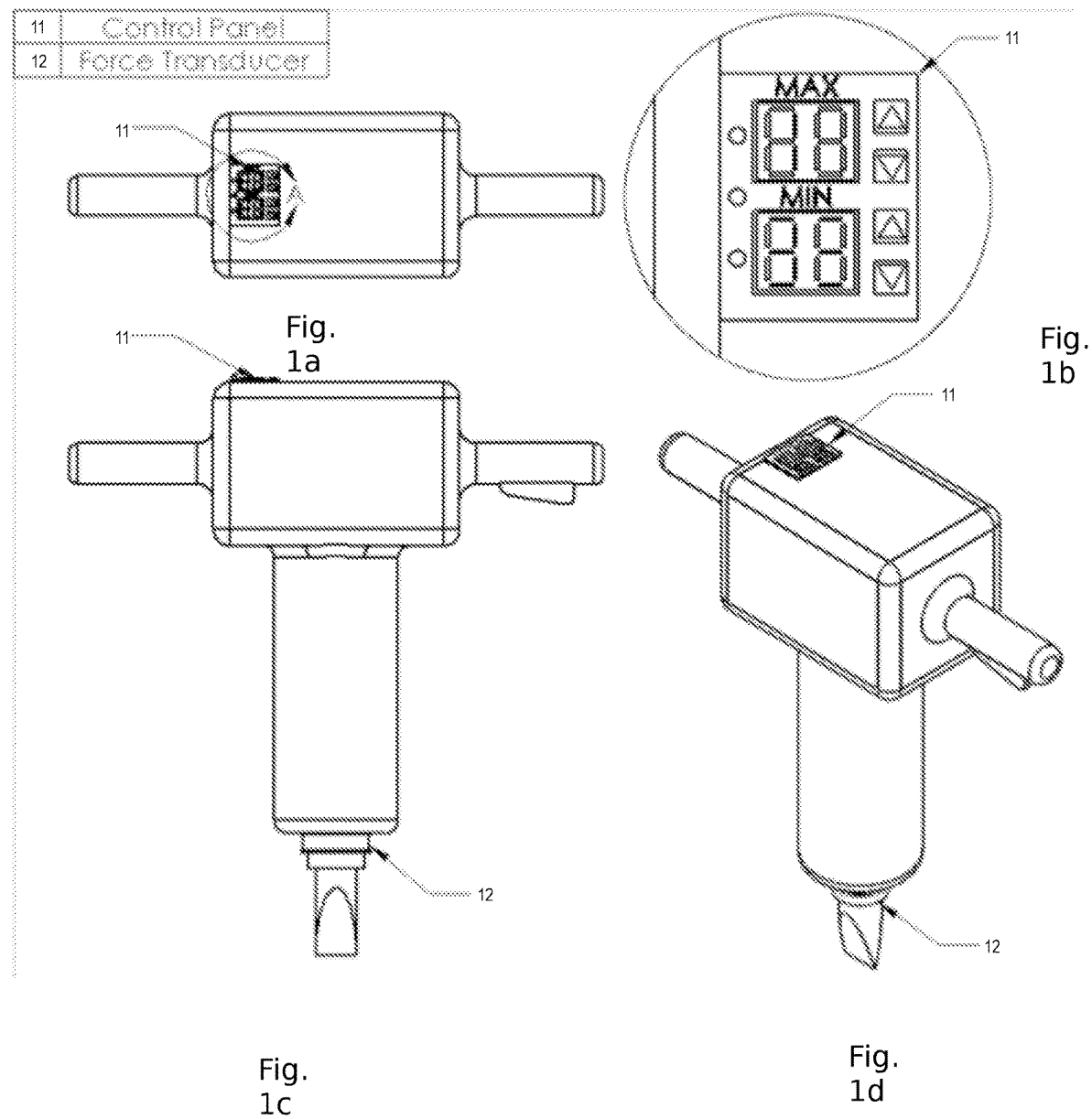
Figures 2A, 2B:
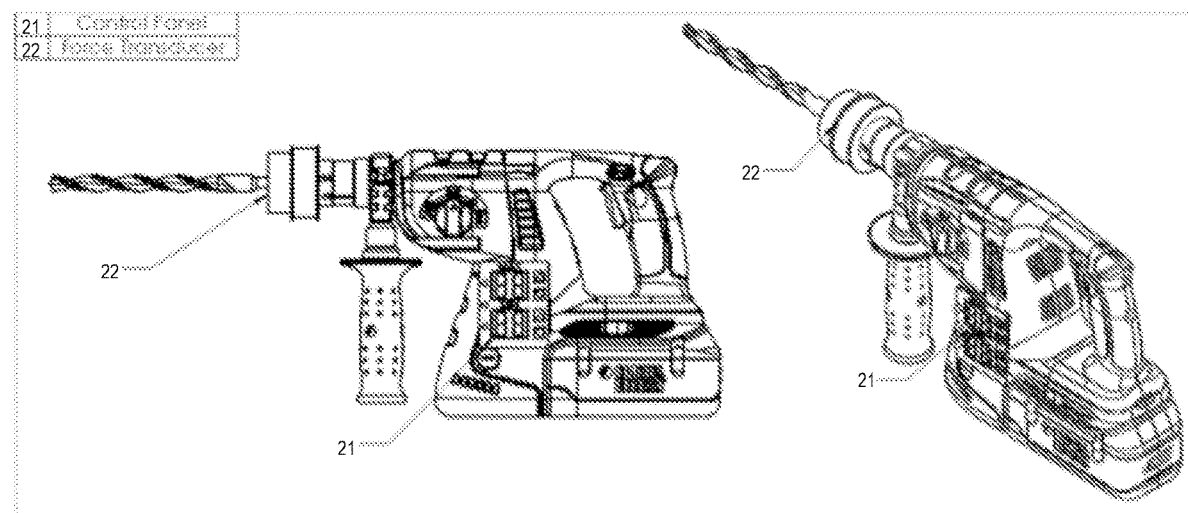
FIG. 2a depicts a side view of a tool according to another embodiment.
FIG. 2b depicts an isometric view of the tool of FIG. 2b.

This invention comprises a novel chipping gun 38 attached to the end of a multi-axis robotic manipulator 37 mounted on a powered, movable, platform that can be raised and lowered to access the underside of structures that may be many tens of feet above the ground, for example, the underside of an elevated highway. The entire assembly is maneuverable under the work area and the platform may be raised to access the concrete. Once the work area is in reach of the arm, the device is able to use numerous tools to complete essential steps of chipping portions of the concrete.

Once in reach of the concrete to be removed, the chipping gun is positioned and operated by the arm. The chipping gun may be constantly moved along a path or operated while being held in a fixed position and then repositioned. The control software utilizes the sensor readings from the chipping gun and a device employed to detect the presence of rebar to determine if the concrete in the area should continue to be chipped at or if the chipping gun should be repositioned. Sensors in the arm and the gun, combined with the judgment of the control software and/or the operator work in concert to determine that the concrete is acceptably hard and that there is no internal structure such as rebar to be damaged and dynamically plan a movement path for the chipping gun and control its operation.

All arm motions and tool actions are coordinated and directed by control software that may function autonomously or allow for the device to be remotely operated by a worker on the ground or some distance away. Their connection to the control device is, in different embodiments, wired or wireless. Real time video feeds of the various parts of the robot and work area allow control software or an operator to monitor the work and manually direct it if needed. In addition, the operator and control software have access to data from sensors (e.g., force or distance sensors) located on or in the arm to aid them in determining that a task has been completed satisfactorily.

As this process creates considerable amounts of dust and debris, the platform is equipped with a shroud 315 that can enclose most of the work area when needed. This approach provides a barrier for the movement of any airborne materials. In various embodiments of the invention, a dust collection system is present in the form of a vacuum 314 that exhausts air from inside the curtain through a filter or a water spraying solution may be employed.

Tools

REBAR LOCATOR. Metal rebar located in concrete is an obstacle when one is attempting to remove concrete with a chipping gun and must be avoided. To prevent inadvertently striking rebar, a sensor 313 is available to the robot that will allow it to detect the presence of rebar even when it is embedded in concrete. The sensor will rely upon electromagnetic interference or some other means of detection to determine the presence of rebar and make note of its location.

Chipping Gun or Reciprocating Hammer

Reciprocating hammers are devices well known in the relevant art that have been used in various construction and demolition fields to affect the removal of materials. These materials can be concrete, asphalt, or other surface materials that need to be removed. The power operated chisel head is typically attached to a reciprocating hammer that is powered by an electric motor or a pneumatic system.

Examples of such systems include hammers used in demolition of concrete decks, removal of asphaltic pavement and ceramic floor tiles.

The operator is required to use the chipping gun or hammer to remove the materials by pushing the tool against the surface of the material to be removed and thereafter to allow the reciprocating action of the tool head to "hammer" out the material.

It is left to the skill of the tool operator to apply adequate force by pushing the tool for contact with the surface, which could be at floor level or ceiling level, to affect the removal. Lack of skill, fatigue and other causes result in a less than optimum amount of push being applied as well as the removal of too much or not enough material as a consequence.

Various embodiments of the present invention include a limit adjustable force sensing transducer 12, 38, that is calibrated periodically, attached to the hammering device and a visual feedback mechanism 11 that may be augmented with an automatic throttling of the hammer's action that alerts the tool operator as to whether the underlying material has reached a preset hardness (density) so that further material removal is not necessary. The amount of force that the hammer applies can be calibrated depending on the hardness of the material to be removed and also the hardness of the material that is to be retained.

The force transducer 12 is attached to the housing of the chipping gun and at the beginning of the operation the minimum and maximum hardness limits may be entered which dynamically varies the hammer's action by increasing or decreasing the amount of force applied through the chisel.

At a set interval of hammer impulses, the force transducer 12 averages the hardness of the material it is measuring and affects the feedback system.

In another embodiment, the high resolution and range accelerometers is used to correlate the coefficient of restitution of the impact of the hammer against the material to a hardness instead of a force transducer. A harder material elicits a high restitution and therefore a higher reading on the accelerometer. The amplitude of the acceleration reading is correlated to the hardness of the material.

This is calibrated periodically. The accelerometer is affixed to the chisel of the hammer to attain the highest accuracy of reading against the material.

The transducer 12 also generates a signal that appears as a visual signal with LEDs of varying color, such as green LED—means material is below threshold hardness and hammer operates at maximum speed and intensity, yellow LED means material being chiseled is approaching target threshold and hammer reduces reciprocation speed and intensity and finally red LED means material being encountered by the chisel is at threshold hardness and hammering action stops. This provides a visual feedback to the operator as to the hardness/density of the material as well as indicate that hammer is working properly.

In another embodiment of the invention, the entire assembly of reciprocating hammer 38, chisel, force transducer 39 and feedback mechanism is connected to a robotic arm that removes the human arm as the force applying mechanism. The general principles of the operation are the same except the robotic mechanism is controlled from a distance by the operator using a control joystick or other similar means.

Arm

A multi-axis robot arm 37 is used to position all tools and manipulators. These arms are currently produced by numerous companies and known in the prior art, and there exist many different models with different abilities. All such arms are able to move in a very controlled manner and are able to position themselves with a high degree of repeatability. The invention makes use of an existing arm or a custom designed one that satisfies requirements for lifting capacity, reach, applicable force, and robustness.

Platform Lift

The arm and tools are located on a lifting mechanism to allow for the arm to be positioned under and then raised to the vicinity of the work area. The lift may be a prior art model customized to meet any requirements, or may be a custom built machine. To allow access to the underside of bridge and roadway decks, the lift has the ability to raise the platform at least approximately forty (40) feet. The base of the lift is motorized and able to move under its own power. The operation of the lift and the movement of the base is controlled by either a control program or a human operator.

Figure 9:
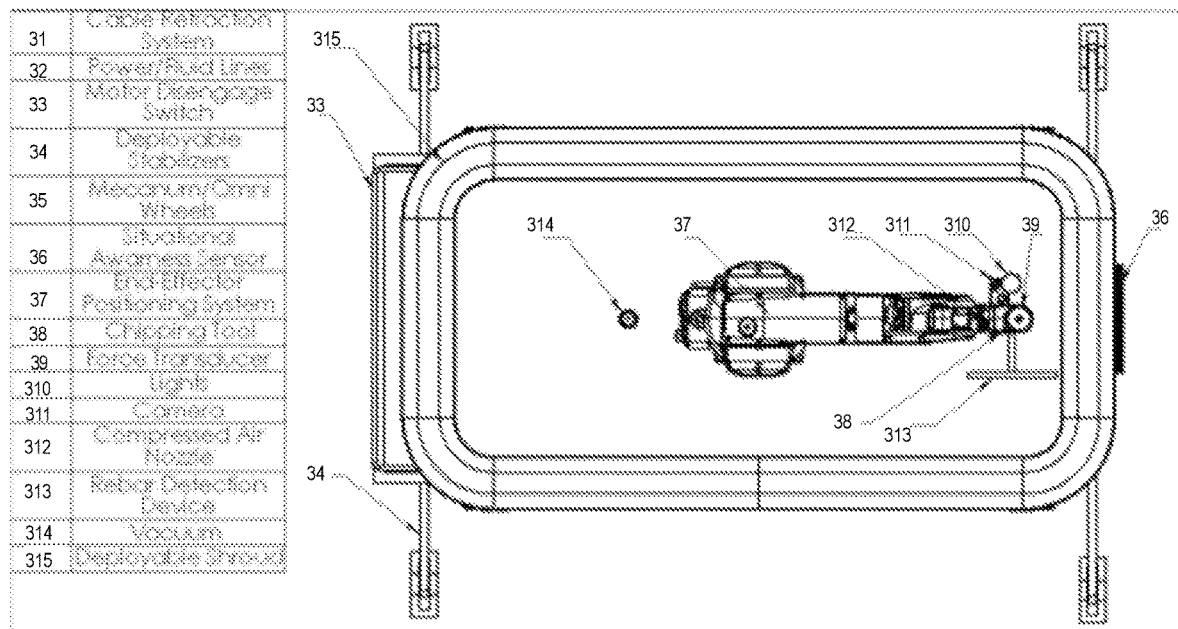
FIG. 9 depicts a top view of the concrete chipping robot of FIG. 8.
Figure 10:
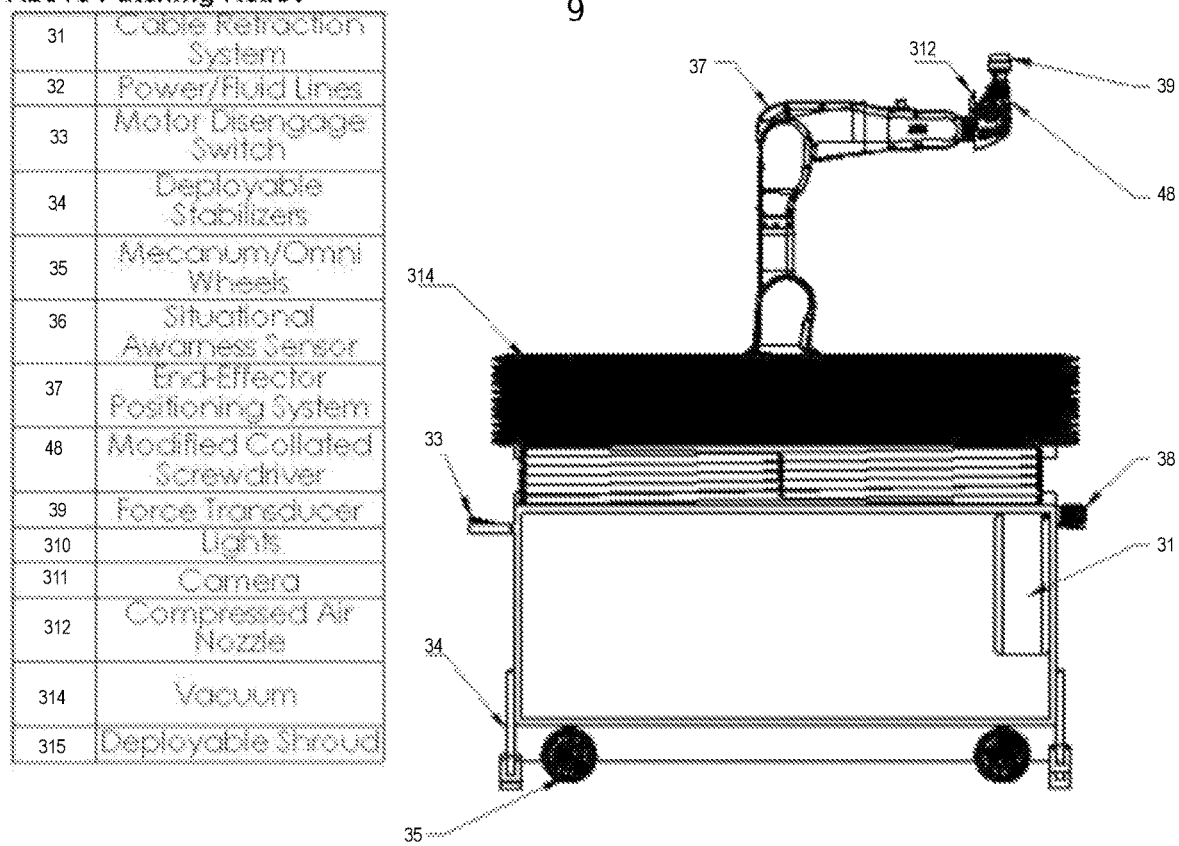
FIG. 10 depicts a side view of the concrete chipping robot of FIG. 8.
Figure 15:
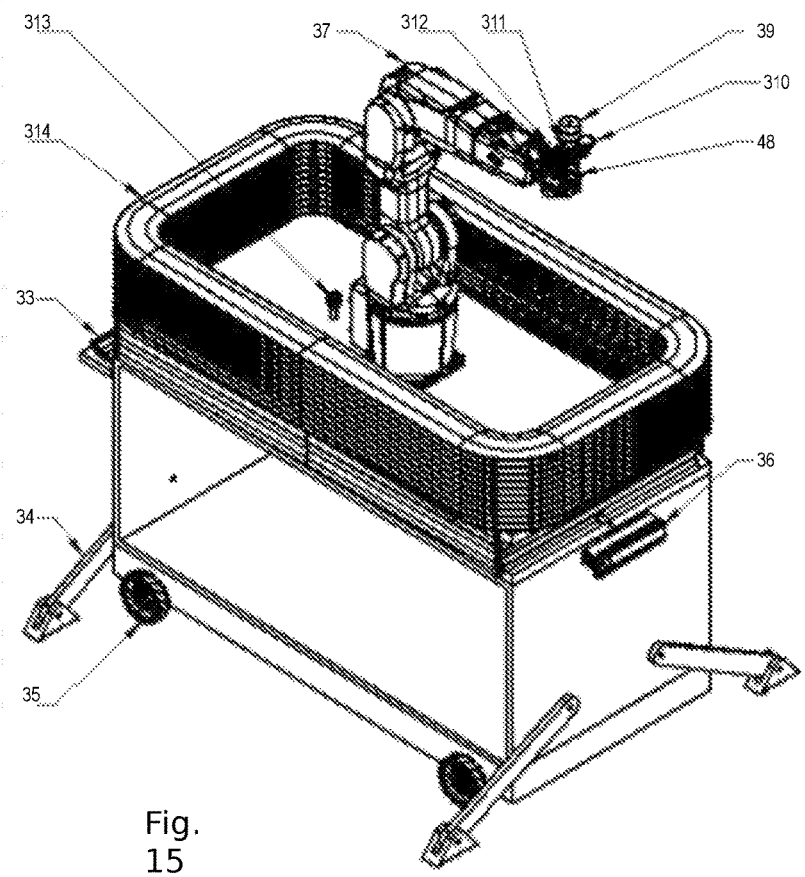
FIG. 15 depicts a concrete chipping robot according to yet another embodiment.
Figure 16:
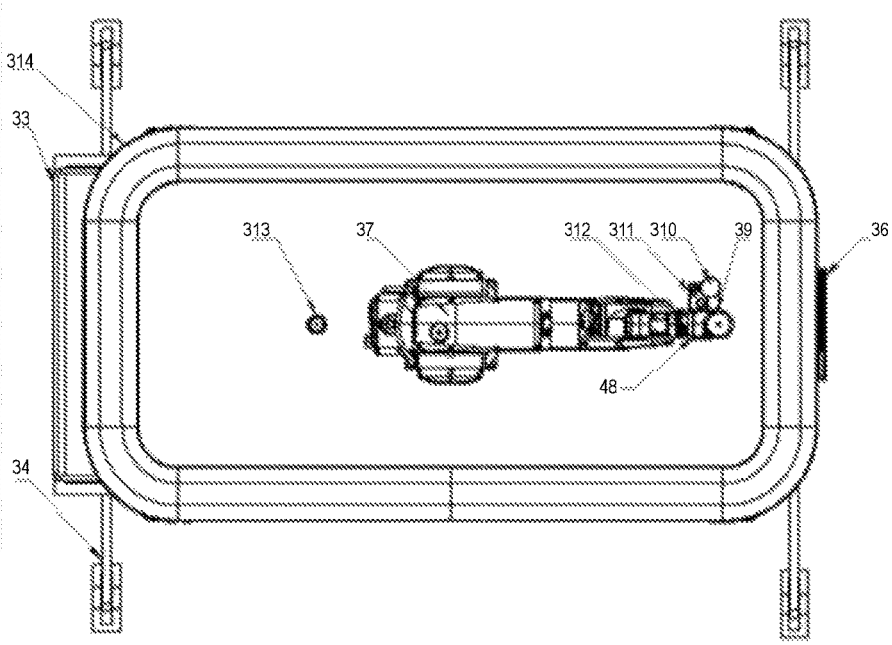
FIG. 16 depicts a top view of concrete chipping robot of FIG. 15.
Figure 17:
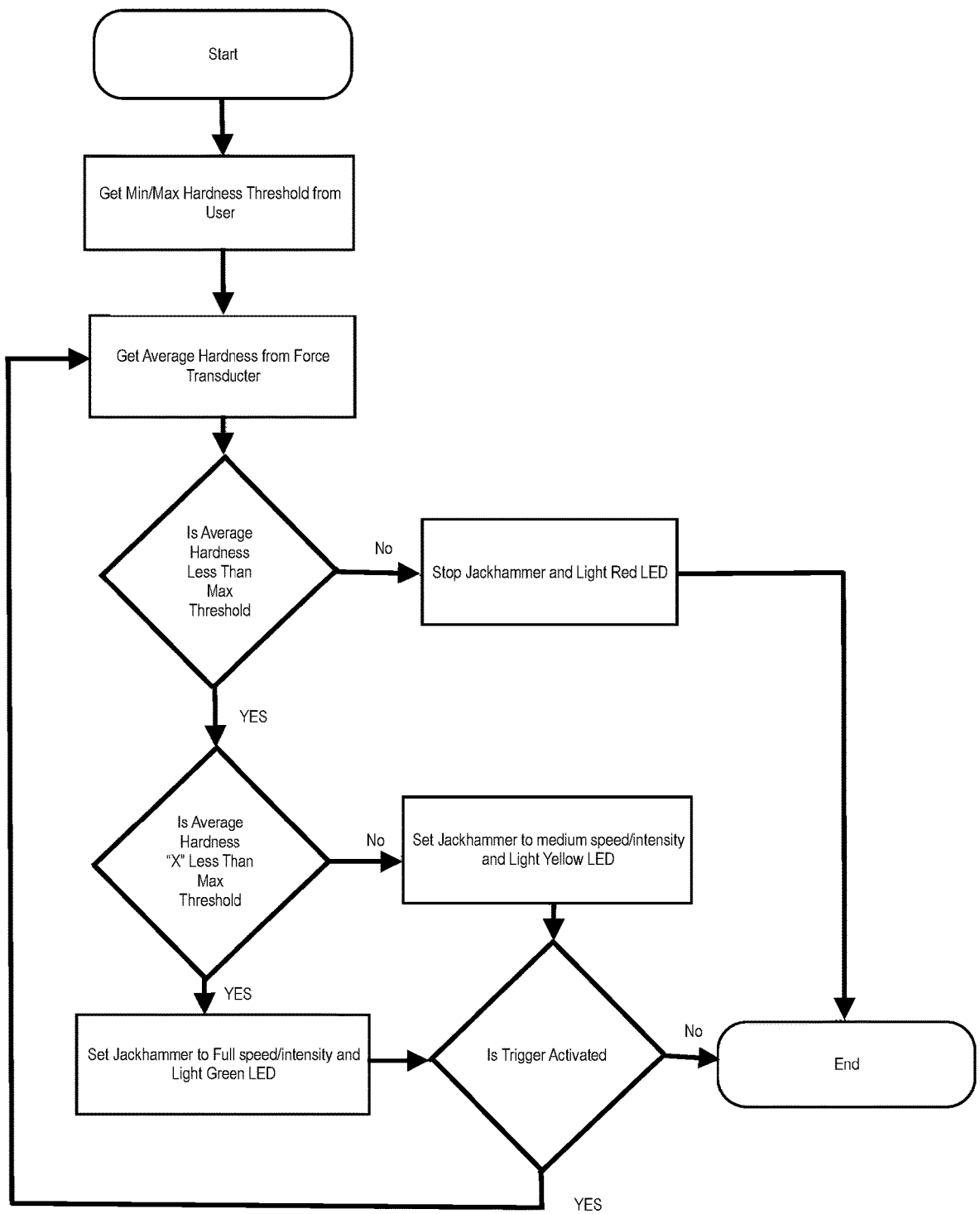
FIG. 17 is a flow chart of the operation of the invention.

As shown in FIGS. 3-16, the chipping robot, in various embodiments, may comprise: (1) a cable retraction system 31; (2) power/fluid lines 32; (3) a motor disengage switch 33; (4) deployable stabilizers 34; (5) mecanum/omni wheels 35; (6) a situational awareness sensor 36; (7) an end-effector positioning system 37; (8) a chipping tool 38; (9) a modified collated screwdriver 48; (10) a force transducer 39; (11) lights 310; (12) a camera 311; (13) a compressed air nozzle 312; (14) a rebar detection device 313; (15) a vacuum 314; and (16) a deployable shroud 315.

In use, the invention is employed as described above. Although this invention has been described with a certain degree of particularity, it is to be understood that the present disclosure has been made only by way of illustration and that numerous changes in the details of construction and arrangement of parts may be resorted to without departing from the spirit and scope of the invention.

What is claimed is:

1. A chipping robot comprising:
    a multi-axis robot arm;
    a chipper connected to an end of the arm;
    density determining means proximate to the chipper;
    a controller operationally connected to the density means, the controller producing a density measurement; and
    reporting means capable of reporting a representation of the density measurement.

2. The chipping robot as described in claim 1, further comprising:
    a vertically adjustable platform; and
    means to mount the arm to the platform.

* * * * *